Figure 5:
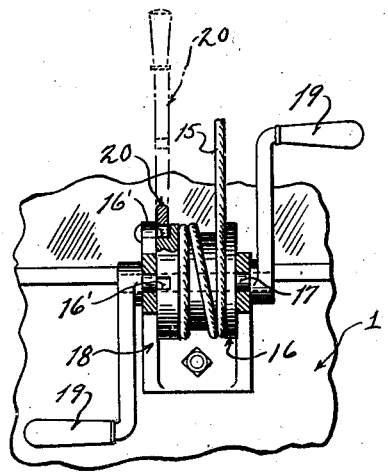

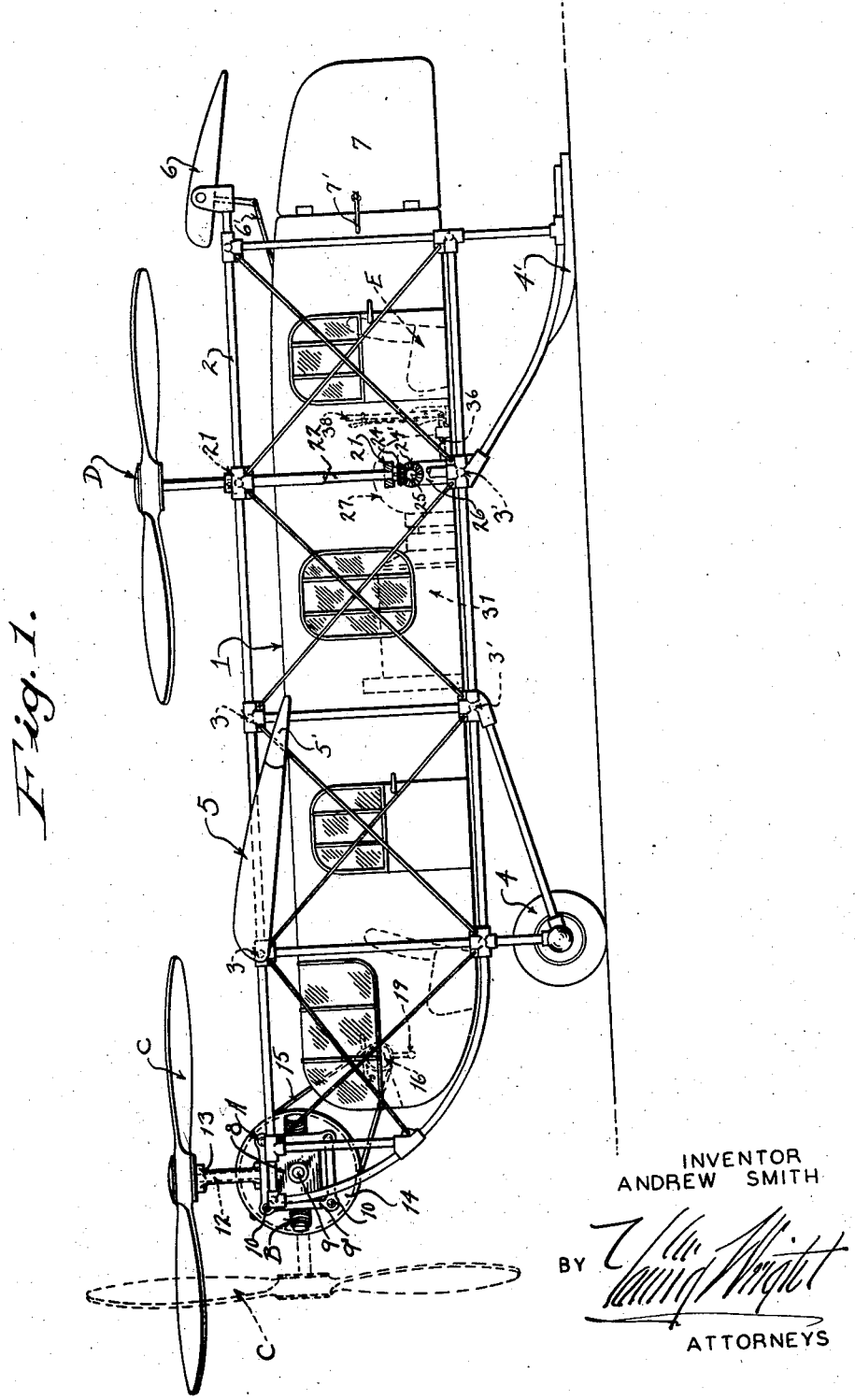

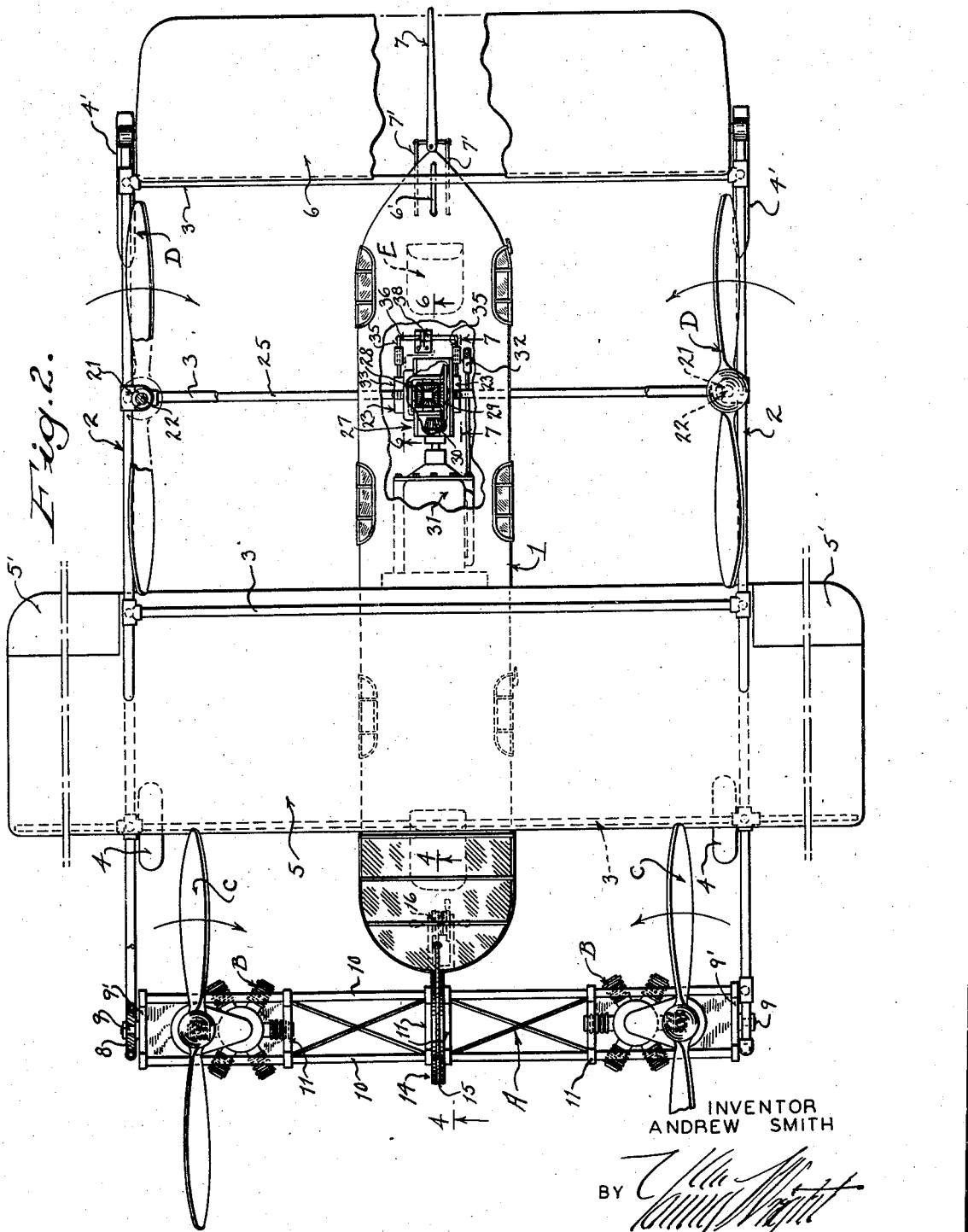

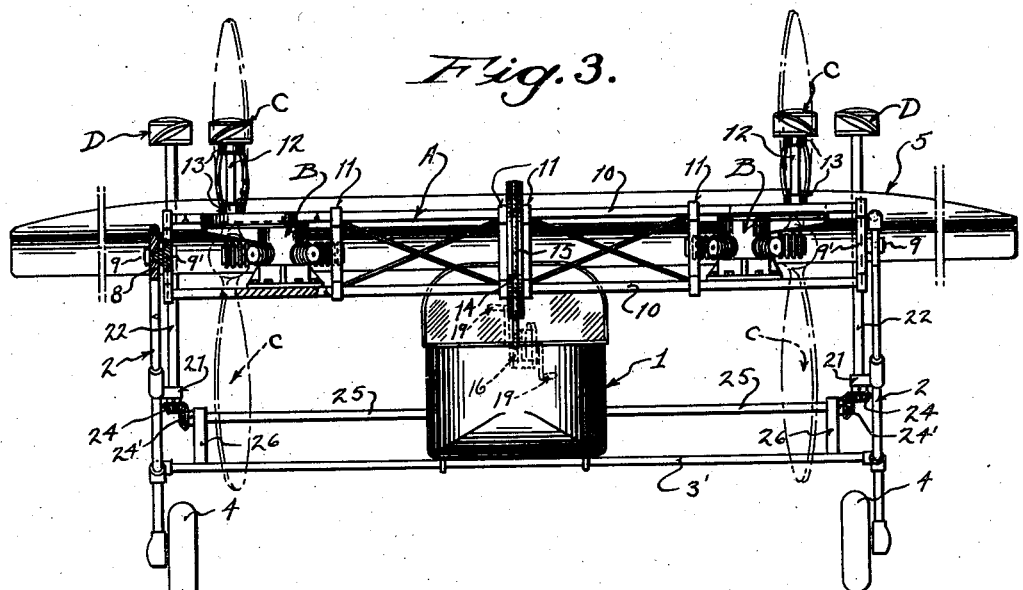
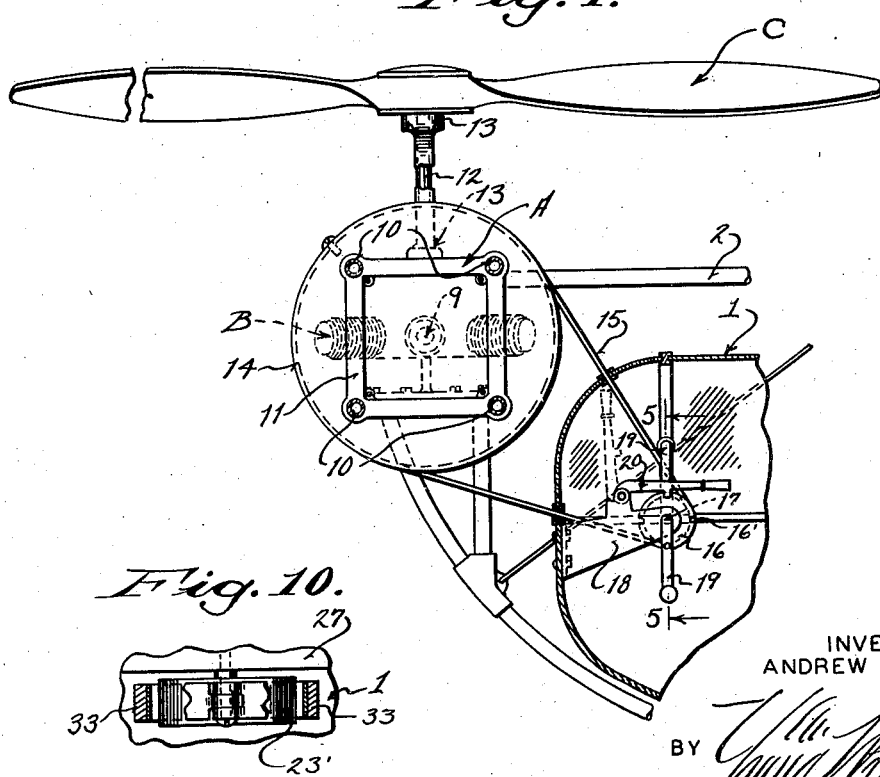
INVENTOR
ANDREW SMITH

July 8, 1947.  A. SMITH  2,423,625
COMBINED AEROPLANE AND HELICOPTER
Filed Jan. 19, 1945   4 Sheets-Sheet 4

INVENTOR
ANDREW SMITH

BY

ATTORNEYS

Patented July 8, 1947

2,423,625

UNITED STATES PATENT OFFICE 2,423,625

COMBINED AEROPLANE AND HELICOPTER

Andrew Smith, Milwaukee, Wis.

Application January 19, 1945, Serial No. 573,489

1 Claim. (Cl. 244—7)

My invention has for its primary object to provide a simple and efficient, combined high-speed aeroplane and universally controlled helicopter.

Other objects of my invention are:

To provide an adjustable pair of motor driven nose propellers capable of manual movement, to position the same upon a vertical plane, and intermediate angular points, to a horizontal plane, in conjunction with a pair of motor driven horizontally positioned propellers at the tail of the fuselage, whereby the fuselage may be lifted a few feet straight up from the ground, and moved backward and forward, and also by proper manipulation, to position the fuselage at an upwardly inclined angle from its nose, or a downwardly inclined angle therefrom, to facilitate raising of the plane or lowering it under manual control, it being understood that when the plane is traveling at normal speed, the forward propellers are vertically positioned, and the rear propellers are at rest. It should be also understood that to back the plane, the tail propellers are independently controlled by a brake mechanism, whereby the speed of said propellers differs with relation to each other.

From the foregoing essential features, it will be noted that the plane is under helicopter control, whereby it may be raised slightly from the ground and moved backward and forward, which is particularly desirable under battlefield conditions, when said machine is utilized for recovering the wounded, irrespective of the ground conditions.

To provide a standard aeroplane fuselage, supported and nested with a light skeleton frame, which frame carries adjustable driven front propellers, wings, rear driven lifting propellers, the usual rudder and elevator wings.

To provide an oscillating forwardly positioned skeleton bridge, carried by the fuselage frame, having a plurality of motor driven propellers mounted therein, and a rear or tail set of horizontally rotatable lifting and lowering propellers, and manually controlled means for rocking the oscillatory propeller carried by the bridge, whereby the propellers are set at a vertical position for straight-way travel, or a horizontal or intermediate position, as the case may require in raising or landing operation.

To provide motor driven, horizontally disposed tail propellers, with manual means for independently varying the speed of said propellers, relative to each other, or to cause the same to move in synchrony.

To provide the combination of a high-speed aeroplane and helicopter, assembled from standard parts, whereby efficiency is insured, and the development of expensive, detailed, structural features is avoided, resulting in speeding up of production upon an assemblage to thereby materially lower manufacturing costs.

With the above and other minor objects in view, the invention consists in certain peculiarities of construction and combination of parts as will be hereinafter set forth in the accompanying drawings, and subsequently claimed.

In the drawings:

Figure 1 represents a side elevation of a combined high-speed aeroplane and helicopter, embodying the features of my invention.

Figure 2, a plan view of the same, with a part of the fuselage broken away to illustrate structural features.

Figure 3, a front elevation of the machine looking toward the nose end thereof.

Figure 4, an enlarged fragmentary sectional elevation of the nose portion of the plane, and associated adjustable propeller, the section being indicated by line 4—4 of Figure 2.

Figure 5, an enlarged detailed sectional elevation of the manually adjusting means for controlling the angular position of the front or nose propellers, the section being indicated by line 5—5 of Figure 4.

Figure 6:
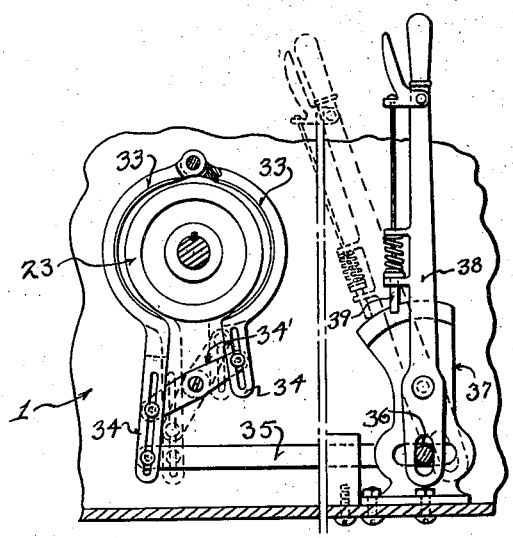

Figure 6, a detailed sectional elevation of a manually controlled brake mechanism for the motor driven, horizontally positioned tail propellers, the section being indicated by line 6—6 of Figure 2.

Figure 7:
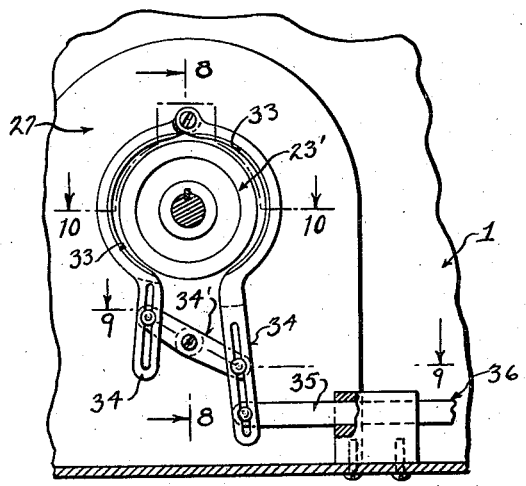

Figure 7, a similar sectional elevation of the brake mechanism upon another plane, the section being indicated by line 7—7 of Figure 2.

Figure 8:
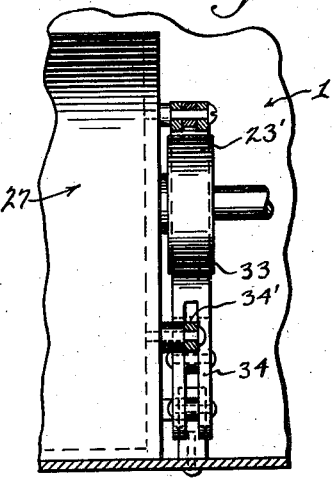

Figure 8, a longitudinal, sectional elevation of the brake mechanism, the section being indicated by line 8—8 of Figure 7.

Figure 9:
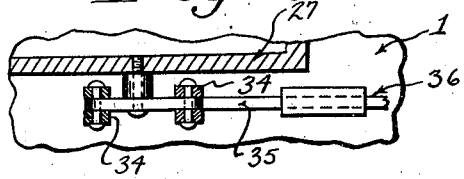

Figure 9, a plan sectional view of the brake actuating lever connections, the section being indicated by line 9—9 of Figure 7, and Figure 10, a detailed plan sectional view of the brake mechanism, the section being indicated by line 10—10 of Figure 7.

Referring by characters to the drawings, 1 indicates any type of fuselage, caged within a skeleton frame, which frame includes cross connected tubular side fences 2—2, in parallel relation to the fuselage, and spaced a predetermined distance from its sides.

The side fences are braced by suitable struts and cross tie rods, and said side fences are connected by transversely disposed upper and lower tubes, 3, 3', respectively, the lower tubes 3' are suitably secured to the bottom of the fuselage, whereby the skeleton frame as a whole, and the fuselage are in rigid connection.

The front nose end of the frame fences carry a forward landing gear 4, and the rear portion, a tail skid 4', whereby the machine is supported.

The fuselage is also provided with the usual front spread of wings 5, which are intermeshed with one of the transverse tubes 3, the wings being provided with ailerons 5'.

The rear end of the skeleton frame has pivotally mounted thereon an elevator wing 6, controlled from the cab in the usual manner by a runner 6', and said rear end also carries a standard rudder 7, controlled by runners 7', conveniently located for manipulation by the pilot.

The upper nose corners of the skeleton frame fence sections, carry bearing blocks 8, for studs 9, which project from brace clips 9', that are connected by transversely disposed tubes 10, which tubes, in connection with intermediate brace clips 11, and cross tie rods, form a light and rigid bridge A, that may be manually oscillated through means hereinafter described.

The bridge A has mounted therein, a pair of standard rotary engines, B, for driving a pair of nose propellers C, which, as indicated by arrows, revolve in opposite directions. The propellers are mounted upon shafts 12, which extend into the housings of the engines, and have spaced bearings 13.

In order to oscillate the bridge, whereby the companion nose propellers may be shifted from a full running vertical position, to a lifting or landing position, I provide means within the nose of the cab for accomplishing the desired result.

The bridge and propeller oscillating means comprises a pulley wheel 14, secured to the central portion of the bridge. Motion is imparted to the wheel by a belt 15, which belt, as best shown in Figure 5, is coiled about a pulley 16, whereby slippage is avoided.

The shaft 17 of the pulley is journaled in arms 18 of a bracket, projecting from the cab wall, and said shaft terminates with hand cranks 19, whereby the pulley is rotated, to oscillate through its belt connection, the bridge which carries the pulley wheel 14.

One flange of the pulley 16 is provided with a series of notches 16', for lock engagement with a toothed hand lever 20, which lever is pivoted to one of the bracket arms 18.

From the foregoing description, it is apparent that when the front or nose propellers are in a vertical position, as indicated in dotted lines, Figure 1, the same can be manually operated by the wheel and pulley connection to a horizontal position, as indicated in full lines, Figure 1, and said propellers may be locked in such positions by the hand lever 20, which may be dropped from its dotted position, as shown in Figure 4, to the full line position, whereby its tooth engages one of the notches of the pulley flange.

It is also apparent that the drive propellers, C, may be adjusted at intermediate angular positions when desired, and locked by the hand lever 20.

Under certain conditions, I may substitute a worm wheel segment for the pulley 14, and a worm in mesh therewith, having its shaft extending through the nose of the fuselage, with a crank thereon, whereby the bridge carrying the propellers may be oscillated back and forth, and thus the same will be locked in any predetermined adjusted position through an arc of 90°.

It is also contemplated, under certain conditions, to provide a mechanism for adjusting the pitch of the nose propellers for speed and lifting positions.

The fence elements, 2, of the frame, at their rear portions, are provided with bearing ears 21, for companion vertically disposed shafts 22, which shafts, at their upper ends, carry raising and lowering propellers D, it being noted that the pair of horizontally rotative propellers are spaced a distance from the fuselage side walls, for efficiency in operation.

The lower ends of the propeller shafts 22 carry bevel gears 24, which bevel gears are meshed with like bevel gears 24', carried by driving axles 25, journaled in arms 26, that extend upwardly from, and aligned frame tube 3'. The inner ends of said shafts are journaled in a housing 27, encasing a differential gear mechanism 28. Power is imparted to the bevel gear wheel 29 of the differential, from a bevel pinion 30, carried by the shaft of an engine 31, that is anchored to the floor of the fuselage, the said engine and differential being of any standard type.

The engine power is controlled by an accelerator foot pedal 32, accessible to the engineer, provided with a seat E, as indicated in dotted lines, Figures 1 and 2.

Under conditions where it is desirable to bank the helicopter for guiding it to a landing, I provide each propeller driving shaft 25 with brake wheels 23, 23', fitted with brake shoes 33, which brake shoes are pivoted to walls of the differential housing 27.

The brake shoes are controlled by slotted legs 34, engaging a pivoted toggle link 34', one of each set of legs carries an arm 35 of a yoke 36. The yoke bar 36 extends through a slot in a bracket 37, as illustrated in Figures 2 and 6 of the drawings.

The bracket 37 is anchored to the floor of the fuselage, adjacent to seat E, and pivoted thereto is a hand lever 38, having a lower end, engaging the yoke bar 36, and the upper end is provided with a spring controlled locking tongue 39, which tongue and lever is normally locked to the notched detent end of the bracket 37 in a neutral position.

As indicated especially in Figures 6 to 9, incl., when the hand lever 38 is in its neutral position, the brake shoes are free from the brake wheels 23, 23', hence, should it be desired to retard one of the set of propellers D, the hand lever would be shifted from right to left, as indicated in dotted lines, Figure 6, and should it be desired to slow up the speed of the opposite propeller, the handle would be shifted from its neutral position to the right.

From the foregoing description, with reference to selectively controlling the helicopter propellers, it is apparent that when the speed of one of the same is retarded, it will cause that side of the machine to dip or incline downwardly, whereby the direction of travel of the machine, either backward or forward, is controlled.

From the foregoing description, it is apparent when both sets of propellers are revolved at the same speed, the machine may be lifted straight up from the ground, and sustained in its lifted position, for example, five or ten ft. Should it then be desired to back the machine to a given point, the speed of the tail propeller D is retarded, whereby said machine will assume a downward angle, with relation to the nose, and hence, said machine will slide backwardly to the desired point where it will be brought to rest.

Should it be desired to move the machine forwardly to pick up an object or load, the helicopter set of propellers will be accelerated in speed, whereby the tail of the fuselage will be tilted upwardly, and thereafter the plane will move forward to the desired landing point.

Assuming now that the point, which it is desired to reach, is off an imaginary central line, intersecting the machine center. All that will be required, is that the right hand or left hand tail propeller be retarded with reference to its speed, whereby the plane may be moved forward or backward at the desired angle from its starting line, due to the differential speed of the tail propellers, which said speed would cause the plane body, to tilt either to the right or left.

In a lifting operation, the machine, as previously stated, may be elevated a few feet from the ground, and sustained in its elevation due to the fact that helicopter propellers at the rear of the machine are offset from the fuselage, and hence, downward air pressure therefrom exerted from the ground surface, is sufficient to maintain the machine at the low elevation for manipulating the machine back and forth.

From the foregoing, it should be emphasized that a machine, embodying the primary features of my invention, would include at least one nose propeller, and a pair of tail propellers, obviously, however, there may be a multiple series of nose or driving propellers, and also tail lifting propellers.

It is also obvious, when the combination machine is at ordinary flight elevation, it will be driven by the nose propeller, rotating vertically, as is the case of a standard aeroplane, and the tail propellers will be at rest.

While I have shown and described the features of my invention minutely as to detail, it is understood that I may vary the structural features within the scope of the claim.

I claim:

An aeroplane of the helicopter type comprising a skeleton frame having upper and lower sections connected by brace bars, a fuselage nested within the skeleton frame, the forward nose portion of said frame being extended beyond the fuselage, bearing blocks mounted in the nose portion of said frame, brace clips having trunnions mounted in the bearing blocks, transversely disposed tubes connecting the brace clips, the same forming a rigid oscillatory bridge, a pair of rotary engines mounted in the bridge having propellers extending therefrom, a pulley wheel rigidly secured to the center portion of the bridge, and a gear connection between the pulley wheel and fuselage for rocking said bridge from a horizontal position to a vertical position.

ANDREW SMITH.

REFERENCES CITED

The following references are of record in the file of this patent:

UNITED STATES PATENTS

| Number | Name | Date |
| --- | --- | --- |
| 1,303,737 | Spencer | May 13, 1919 |
| 1,766,390 | Lapin | June 24, 1930 |
| 1,659,098 | Hall | Feb. 14, 1928 |
| 1,788,430 | Hall | Jan. 13, 1931 |
| 1,386,712 | Leinweber | Aug. 9, 1921 |
| 1,386,713 | Leinweber | Aug. 9, 1921 |
| 1,736,230 | Styles | Nov. 19, 1929 |
| 1,842,250 | Debrosky et al. | Jan. 19, 1932 |

FOREIGN PATENTS

| Number | Country | Date |
| --- | --- | --- |
| 771,053 | France | July 16, 1934 |